US009510191B2

(12) United States Patent
Toksvig et al.

(10) Patent No.: US 9,510,191 B2
(45) Date of Patent: Nov. 29, 2016

(54) AUTHORIZATION OF NETWORK ADDRESS TRACKING

(71) Applicant: Facebook, Inc., Menlo Park, CA (US)

(72) Inventors: Michael Toksvig, Palo Alto, CA (US); Yael Maguire, Boston, MA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 14/311,125

(22) Filed: Jun. 20, 2014

(65) Prior Publication Data

US 2015/0373537 A1 Dec. 24, 2015

(51) Int. Cl.
H04W 12/02 (2009.01)
H04L 29/06 (2006.01)
H04W 12/06 (2009.01)

(52) U.S. Cl.
CPC .............. *H04W 12/02* (2013.01); *H04L 63/10* (2013.01); *H04W 12/06* (2013.01)

(58) Field of Classification Search
CPC ....... H04L 63/08; H04L 63/10; H04L 67/10; H04W 12/08; H04W 12/06
See application file for complete search history.

(56) References Cited

U.S. PATENT DOCUMENTS

| 6,640,145 | B2 | 10/2003 | Hoffberg et al. |
| 6,850,252 | B1 | 2/2005 | Hoffberg |
| 6,961,310 | B2 | 11/2005 | Cain et al. |
| 6,990,293 | B2 | 1/2006 | Hu |
| 7,436,887 | B2 | 10/2008 | Yeredor et al. |
| 8,046,313 | B2 | 10/2011 | Hoffberg et al. |
| 8,553,037 | B2 | 10/2013 | Smith et al. |
| 8,631,068 | B1 | 1/2014 | Jannink et al. |
| 9,219,682 | B2 | 12/2015 | Vasseur |
| 9,300,612 | B2 | 3/2016 | Bates |
| 2006/0265508 | A1* | 11/2006 | Angel ............... H04L 29/12047 709/230 |
| 2007/0083915 | A1* | 4/2007 | Janakiraman ......... G06F 21/316 726/4 |
| 2007/0271339 | A1* | 11/2007 | Katz ..................... G06F 19/327 709/204 |
| 2008/0086448 | A1 | 4/2008 | Huh et al. |
| 2009/0219941 | A1 | 9/2009 | Cardozo et al. |

(Continued)

OTHER PUBLICATIONS

U.S. Appl. No. 14/333,353 by Ahki, F., et al., filed Jul. 16, 2014.

(Continued)

*Primary Examiner* — Yonas Bayou
(74) *Attorney, Agent, or Firm* — Perkins Coie LLP

(57) ABSTRACT

Various embodiments are disclosed for enabling a user to physically acknowledge monitoring of their mobile device's network address (e.g., upon entering a store to track the user's movement through the store based upon the mobile device's MAC address). An Access Point coupled with a network system may identify the user device's MAC address, but the network system may defer retention and use of the MAC address until the user provides a physical authorization to do so. The user may provide such a physical authorization by placing their mobile device in physical proximity to a kiosk. The kiosk may emit a signal via, e.g., a magnetic field, radiation, sonification, imaging, etc. An application running on the user device may receive this signal. For example, the kiosk may emit a magnetic field to manipulate the user device's compass hardware. The application may monitor and derive a kiosk identifier from these manipulations. The application may then provide the kiosk identifier (and the device MAC address in some embodiments) to the network system to verify the user's willingness for their MAC address to be monitored.

23 Claims, 14 Drawing Sheets

(56) References Cited

U.S. PATENT DOCUMENTS

| | | | |
|---|---|---|---|
| 2010/0057541 A1* | 3/2010 | Bonner | G06Q 30/0261 705/26.1 |
| 2010/0128695 A1 | 5/2010 | Nagaraja et al. | |
| 2010/0183053 A1* | 7/2010 | Tran | H04L 5/0008 375/219 |
| 2010/0208621 A1 | 8/2010 | Morper | |
| 2011/0106624 A1* | 5/2011 | Bonner | G06Q 30/0261 705/14.58 |
| 2011/0116389 A1 | 5/2011 | Tao et al. | |
| 2011/0228696 A1 | 9/2011 | Agarwal et al. | |
| 2012/0173620 A1 | 7/2012 | Holostov et al. | |
| 2013/0121686 A1 | 5/2013 | Voigt et al. | |
| 2013/0164715 A1 | 6/2013 | Hunt et al. | |
| 2014/0018095 A1* | 1/2014 | Parvizi | H04W 4/043 455/456.1 |
| 2014/0114738 A1* | 4/2014 | Tseng | G06Q 30/0241 705/14.27 |
| 2014/0201280 A1 | 7/2014 | Qi et al. | |
| 2014/0274122 A1* | 9/2014 | Tseng | G01S 19/14 455/456.1 |
| 2015/0004903 A1* | 1/2015 | Lyman | H04W 4/008 455/41.1 |
| 2015/0117318 A1 | 4/2015 | Qi | |
| 2015/0235161 A1* | 8/2015 | Azar | G06Q 10/063114 705/7.15 |
| 2015/0237207 A1* | 8/2015 | Ordille | G06F 21/45 379/204.01 |
| 2016/0021586 A1 | 1/2016 | Akhi et al. | |
| 2016/0134372 A1 | 5/2016 | Yogeeswaran et al. | |
| 2016/0134373 A1 | 5/2016 | Gros et al. | |
| 2016/0135110 A1 | 5/2016 | Yogeeswaran et al. | |

OTHER PUBLICATIONS

U.S. Appl. No. 14/511,579 by Maguire, Y., et al., filed Oct. 10, 2014.
U.S. Appl. No. 14/511,597 by Shen, S., et al., filed Oct. 10, 2014.
U.S. Appl. No. 14/534,675 by Yogeeswaran, K., et al., filed Nov. 6, 2014.
U.S. Appl. No. 14/534,690 by Gros, A., et al., filed Nov. 6, 2014.
U.S. Appl. No. 14/534,709 by Yogeeswaran, K., et al., filed Nov. 6, 2014.
Non-Final Office Action mailed Oct. 26, 2015, for U.S. Appl. No. 14/511,597 of Shen, S., et al., filed Oct. 14, 2014.
Requirement for Restriction mailed Dec. 3, 2015, for U.S. Appl. No. 14/511,579 of Maguire, Y., et al., filed Oct. 10, 2014.
Extended European Search Report mailed Jan. 22, 2016, for European Patent Application No. 15193353.8, 8 pages.
International Search Report and Written Opinion mailed Feb. 17, 2016, for International Application No. PCT/US2015/058869, 11 pages.
Non-Final Office Action mailed Jun. 1, 2016, for U.S. Appl. No. 14/534,709 of Yogeeswaran., et al., filed Nov. 6, 2014.
Non-Final Office Action mailed May 20, 2016, for U.S. Appl. No. 14/333,353 of Akhi, F., et al., filed Jul. 16, 2014.

* cited by examiner

AUTHORIZATION OF NETWORK ADDRESS TRACKING

BACKGROUND

Businesses and consumers have many opportunities to interact, e.g., via almost ubiquitous wireless connectivity. By providing wireless connectivity on their premises, businesses need no longer rely upon surveys or websites to infer user purchasing and social behaviors, but may instead acquire this information passively by monitoring consumers' mobile devices when they arrive on location. Similarly, consumers benefit from the pervasive architectures as they have many more methods and opportunities to charge businesses for their data and to reap the business' individually customized responses. For example, previously a consumer would merely receive a coupon, or other token remuneration, for completing a survey. There would be little guarantee that the consumer's personal preferences reflected in the survey would actually be acted upon by the business, their personal preferences likely being lost among the aggregate responses of millions of other consumers. In contrast, a business can now uniquely identify the same customer on successive occasions using the consumer's mobile device and may provide the consumer with individualized offers and benefits. The business's resources are better allocated to serving the individual customer and the individual customer has greater control over the granularity of the data they provide to the business.

However, the passive character of many wireless transactions may thwart the adoption of the systems providing these mutual benefits. Unscrupulous businesses may aggressively acquire user data beyond the consumer's actual preferences and may present irrelevant offers and advertisements to the consumer. Consumers may decline helpful and legitimate business offers fearing to open a floodgate of undesired data gather and advertising. Furthermore, unscrupulous businesses and consumers may impersonate other businesses and consumers to manipulate data collection. Because the collection is passive, businesses may unwittingly acquire information in which they are uninterested and consumers may unwittingly provide information they did not wish to provide.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
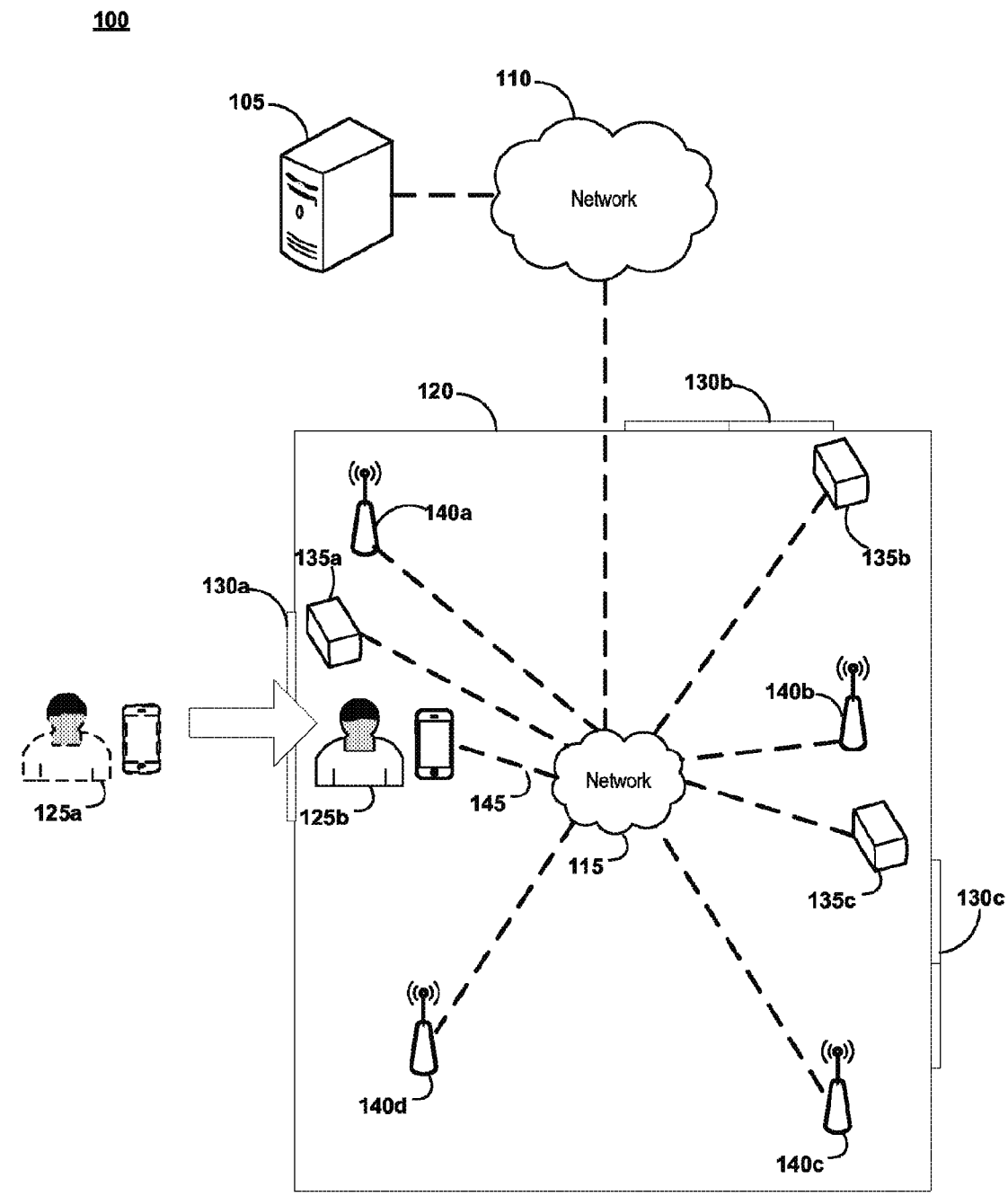
FIG. 1 is a block diagram illustrating an example network topology when a user provides address tracking authorization in a store as may occur in some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Store Use Case

Various embodiments enable a business to recognize that performance, by a consumer or user, of a physical ritual authorizes the business to track the user's mobile device (one will recognize that the terms "mobile device", "mobile computing device", and "user device" may be used interchangeably herein). The physical ritual may include, e.g., placing the mobile device in or near a kiosk upon entering the premises of the business or other organization. Such authorization may be accompanied by a discount or other incentive by the business, as discussed herein.

Upon entering the organization's premises, an Access Point, e.g., a WiFi access point, coupled with a network system may identify a network address, e.g., a Media Access Control (MAC) address, associated with a user's mobile computing device, but the network system may defer retention and tracking of the network address until the user provides a physical authorization to do so. The user may provide such a physical authorization by placing their mobile device in physical proximity to a kiosk. The kiosk may emit a signal via, e.g., a magnetic field, radiation, sonification, imaging, etc. An application running on the user device may receive this signal. For example, the kiosk may emit a magnetic field to manipulate the user device's compass hardware. The application on the user device may monitor and derive a kiosk identifier from these manipulations. The application may then provide the kiosk identifier (and the device network address in some embodiments) to the network system to verify the user's willingness for their network address to be monitored and/or tracked.

FIG. 1 is a block diagram illustrating the network topology when a user provides address tracking authorization in a store as may occur in some embodiments. As a user enters a building 120, e.g., an outlet store, they may travel from a first position 125a outside the range of one or more of the wireless access points 140a-d to a second position 125b within range of one or more of the access points 140a-d. The access points 140a-d may be configured for open access and may establish connectivity with the user's mobile device accordance with the 802.11 TM protocol. The access points 140a-d may be in communication with a local network computer system 115. The local network computer system 115 may be in communication with an on or off-site server 105. For example, the local network computer system 115 may be in communication with the server 105 via an outside network 110, e.g., the Internet.

It may be desirable for server 105 to maintain a record of the locations visited by the user. For example, server 105 may be maintained by a social networking site, by the owner of building 120, by an advertising agency, etc. wishing the monitor the regions of the store the user visits. The network address (e.g., a MAC address) of the user's mobile device may provide a suitable proxy for the user's identity. Accordingly, once the Address Resolution Protocol (ARP) tables of the access points 140a-d have identified the user's network address, it would be desirable to transfer and record this information at the server 105 (or at a system local with the access points).

However, as the 802.11TM open authentication process has proceeded relatively transparently without the user's involvement, retention of such identity information may be considered an undesirable breach of the user's privacy. Accordingly, it would be desirable for the user to manifest their willingness to be tracked in a definitive manner. While a purely software solution, e.g., assenting to an end-user license agreement (EULA) presented by a router connected with the access points 140a-d, may suffice, such an approach lacks the physical confirmation and affirming ritual of a physical acknowledgement. Furthermore, malicious individuals may impersonate the access points 140a-d to trick consumers into providing them with authorization or personal information.

Accordingly, kiosks 135a-c may be placed throughout the building 120, e.g., at entrances 130a-c. The user may interact with the kiosk 135a, e.g., by inserting their mobile device on, in, or near the kiosk to begin the authorization process. For example, an application may be running on the user's mobile device which senses the presence of the kiosk and communicates the performance of the physical ritual to the server 105 (e.g., over the connection provided by one of access points 140a-d).

The kiosks 135a-c may be in communication with the network server and may receive authorization information that they may use to verify their identity to the user device. In this manner, it may be difficult or impossible for a malicious individual to impersonate a genuine kiosk.

Though for purposes of explanation the above example and the majority of the discussion herein is with respect to tracking authorization, one will readily recognize that the various disclosed systems and methods may readily be adapted for other contexts. For example, authorization for activities other than tracking may be performed. As one example, the user may approach a photo booth, place their phone in a kiosk receptacle, and perform a motion ritual (holding or placing the phone in or near the receptacle may itself be the ritual). This will authorize a picture of the user (taken at the photo booth, or retrieved from a storage) to be posted to a timeline or photo gallery on their social network, possibly indicating the user's presence at the establishment hosting the kiosk.

Overview—Process Flow

Figure 2:
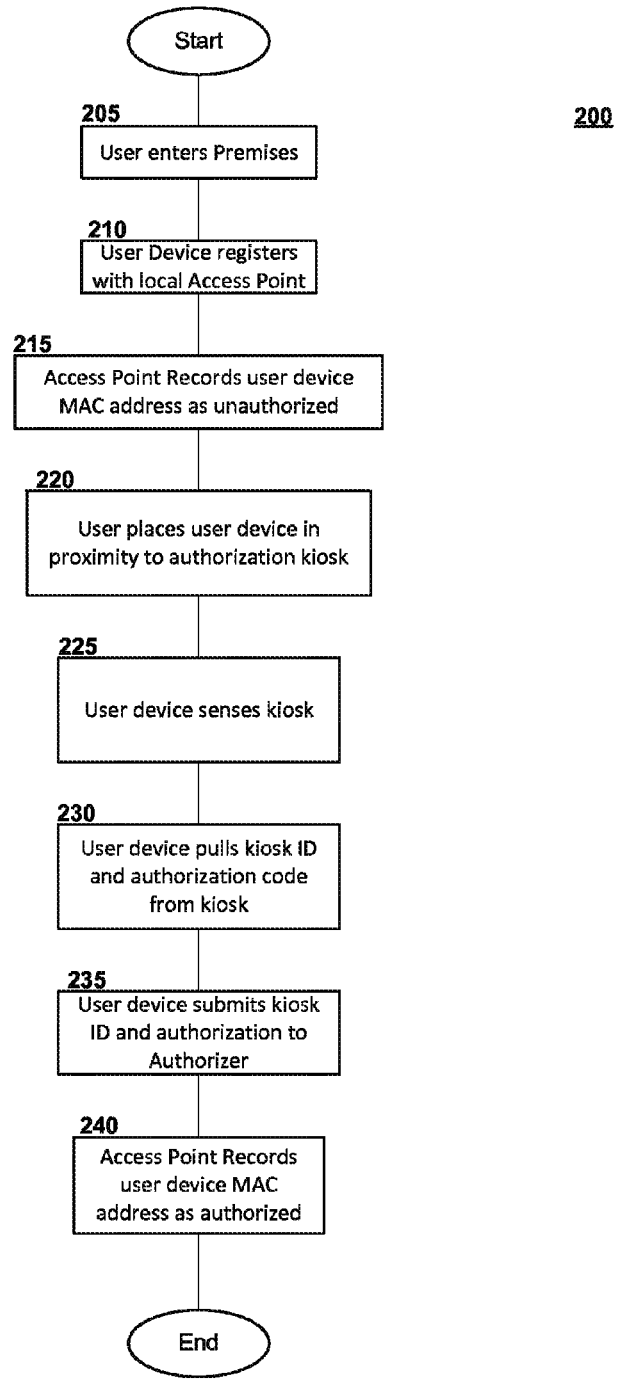
FIG. 2 is a flow diagram illustrating general operations during an authorization event as may occur in some embodiments.

FIG. 2 is a flow diagram illustrating general operations during an authorization event, e.g., using a physical ritual, as may occur in some embodiments. At block 205, the user may enter the organization's premises, e.g., an outlet store building. At block 210, the user's mobile device may register with an access point, e.g., via the 802.11TM protocol. The access points may be configured for open authentication and may not require a password to join the network. At block 215, the access point, or a server in communication with the access point, may determine that the user's network address has not yet been authorized for tracking. Accordingly, the network address may be noted in the ARP table for packet routing purposes, but no separate efforts to determine and/or record the user's location may yet be made.

At block 220, the user may perform a physical ritual at a kiosk acknowledging their willingness to be tracked. For example, the user may place their mobile device against a panel of the kiosk, within an interior of the kiosk, etc., and may rotate or translate the mobile device in an affirming gesture. One will recognize that the exact character of the ritual will vary, and simply placing the mobile device near the kiosk will suffice in some embodiments.

At block 225, the user device may sense the presence of the kiosk. For example, an application running on the mobile device may monitor a sensor, such as a compass, within the mobile device. When the sensor detects a unique and expected signal pattern, the application may recognize that it is receiving a kiosk communication.

At block 230, the user device may determine the identity of the kiosk and/or appropriate verification material. The identity and verification material may be used by the application on the mobile device to verify that the kiosk is not an imposter (e.g., fabricated by a malicious shop owner to encourage tracking authorization for a tracking system other than that presented to the user by indicia on the kiosk).

At block 235, the user device submits the kiosk identification information and the verification to a verification authority, e.g., the server 105. The verification authority may be a dedicated certificate authority outside the mobile device in some embodiments. In some embodiments, the application on the mobile device may have previously received a list of known and authorized kiosk identifiers and may simply consult the list, the list serving as the verification authority.

At block 240, the server and/or access point may make a record of the user's authorization and tracking of the user's network address may begin. The character of such tracking will change from business to business and may depend upon the nature of the information acquired and the user's designated preferences.

Kiosk Form Factor

Figure 3:
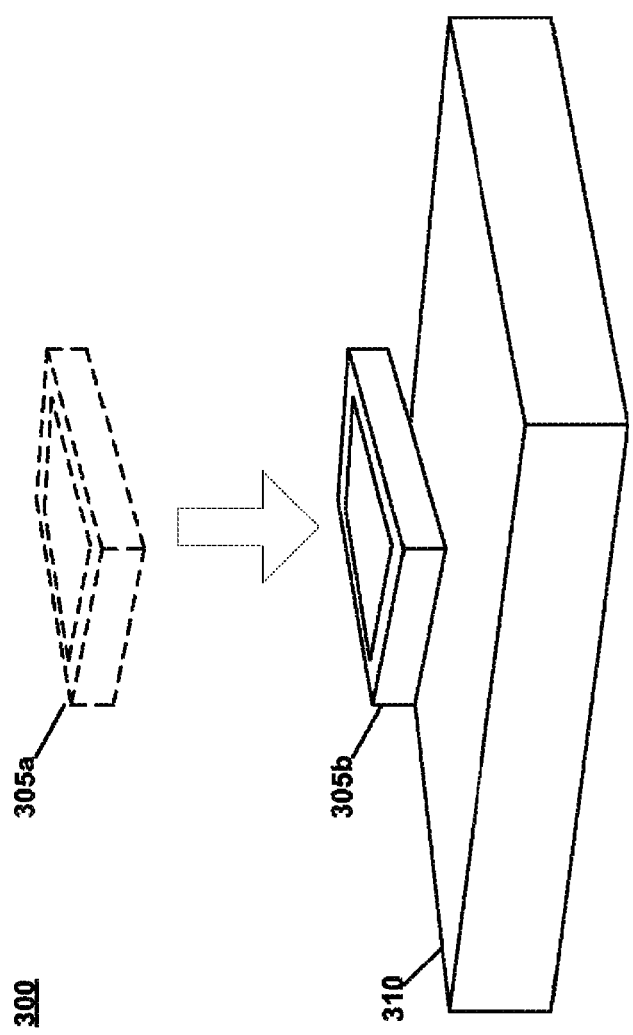
FIG. 3 is a perspective view illustrating the placement of a user device in relation to an open kiosk as may occur in some embodiments.

One will recognize that the kiosk may be provided in a plurality of different suitable forms. For example, FIG. 3 is a perspective view illustrating the placement of a user device in relation to an open kiosk as may occur in some embodiments. The open kiosk 310 may be, e.g., a wireless charging platform, a Near-Field antennae, a logo, etc. As the user device moves from a position 305a out of the kiosk's range to a position 305b within range, the user device may detect one or more signals emanating from the kiosk 310. The signal emanating from the kiosk 310 may be sonic, electromagnetic (near field, infrared, etc.), purely magnetic, etc. For example, a store may present customers with a charging station where they can briefly lay their mobile device. In exchange for the free charging, the user may agree to authorize tracking.

Figure 4:
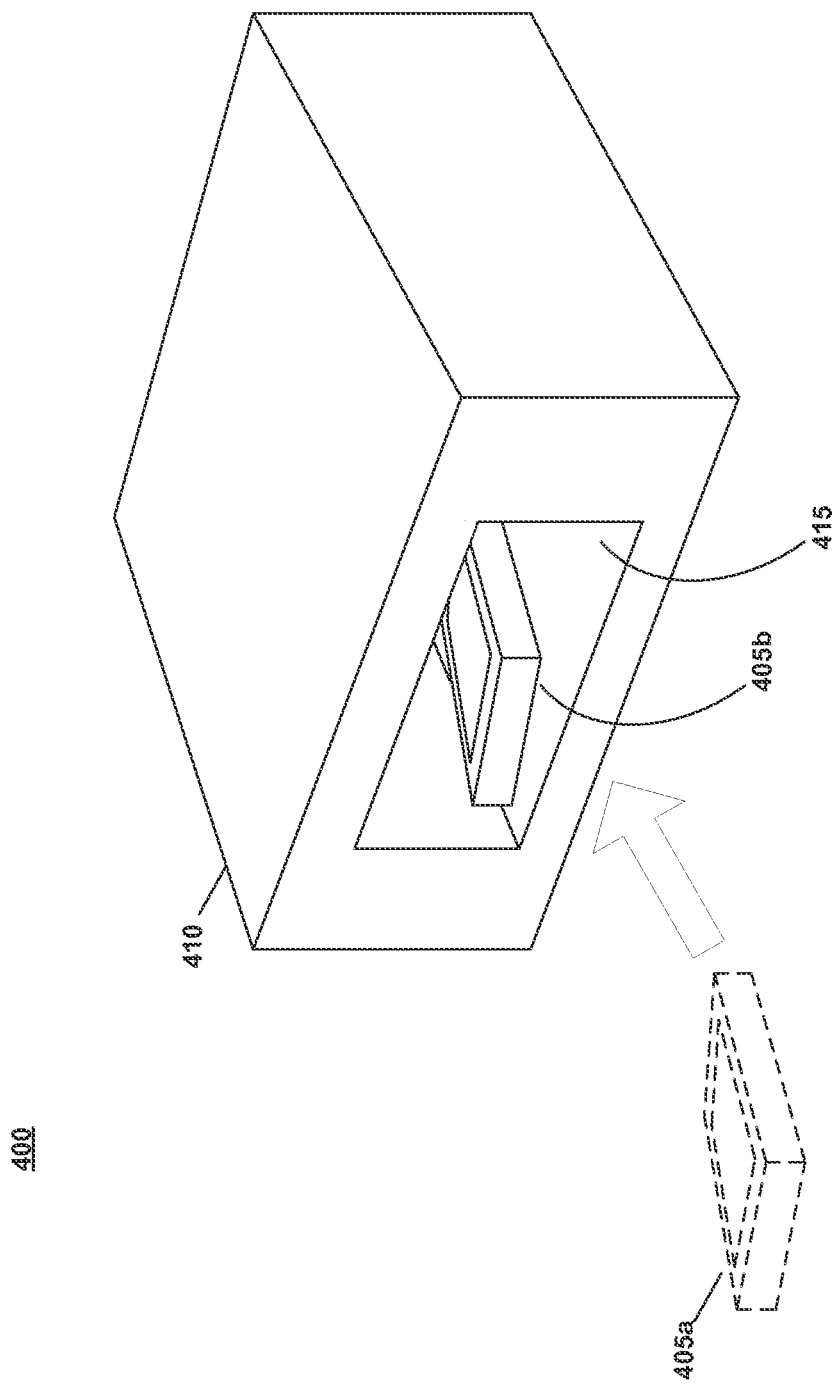
FIG. 4 is a perspective view illustrating the placement of a user device in relation to an enclosed kiosk as may occur in some embodiments.

As another example, FIG. 4 is a perspective view illustrating the placement of a user device in relation to an enclosed kiosk as may occur in some embodiments. As the user device moves from a position 405a out of the kiosk's range to a position 405b within range, the user device may detect one or more signals emanating from the kiosk 410. In this example, the region 415 inside the kiosk 410 may provide a enclosure in which the kiosk's transmissions may emanate. The region 415 need not be entirely enclosed as depicted in this example. The signal emanating from the kiosk 410 may be sonic, electromagnetic (near field, infrared, etc.), purely magnetic, etc.

Relative Orientation Determination

Figure 5:
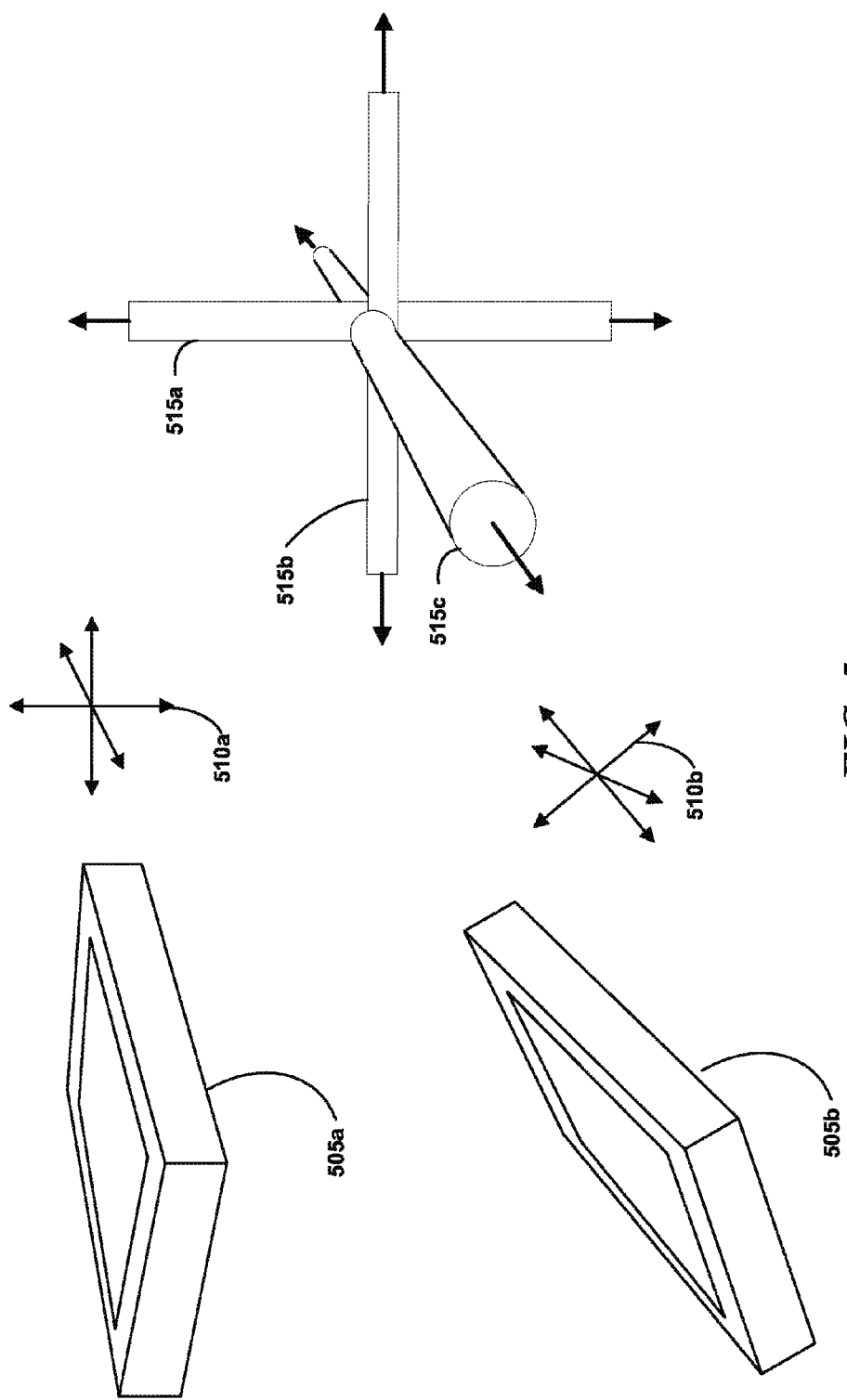
FIG. 5 is a block diagram illustrating a relative orientation between a kiosk signal generator and a sensing device, e.g., a compass, in a user device as may occur in some embodiments.

FIG. 5 is a block diagram illustrating a relative orientation between the signal lobe coordinates 515a-c of a kiosk signal generator and the coordinates 510a, 510b of a sensing device, e.g., a compass, in a user device as may occur in some embodiments. In some embodiments, a peripheral may be attached to the user device to sense the kiosk's signal. Some embodiments instead take advantage of the existing sensors on the mobile device. For example, some embodiments use the compass on the mobile device to detect the kiosk's signal. Unlike the weak magnetic field of the Earth to which the compass is typically directed, the magnetic field emanating from a kiosk may be overpoweringly strong and of a considerably different character. Accordingly, an application on the mobile device may monitor the compass to determine if such a unique and unnatural field has been detected. Compasses included in mobile devices often sense the Earth's magnetic field in three dimensions (as the user may not be holding the mobile device parallel to the Earth when performing a measurement). Though not necessarily designed for receiving kiosk signals, various embodiments may instead apply this same compass hardware/firmware/software for kiosk detection and communication.

Accordingly a user device in an orientation 505a may have a compass component in an orientation 510a relative to the coordinates 515a-c of a magnetic field transmission at a kiosk. Similarly, a user device in an orientation 505b may have a compass component in an orientation 510b relative to the coordinates 515a-c of the kiosk's magnetic field transmission. The coordinates 515a-c of a magnetic field may be generated by one or more antennae or electromagnets in the kiosk. A Procrustes fit, or analogous transformation determination method, may be used based, e.g., on the signal strength to determine the relative orientation.

SubSignal Transmission

Figure 6:
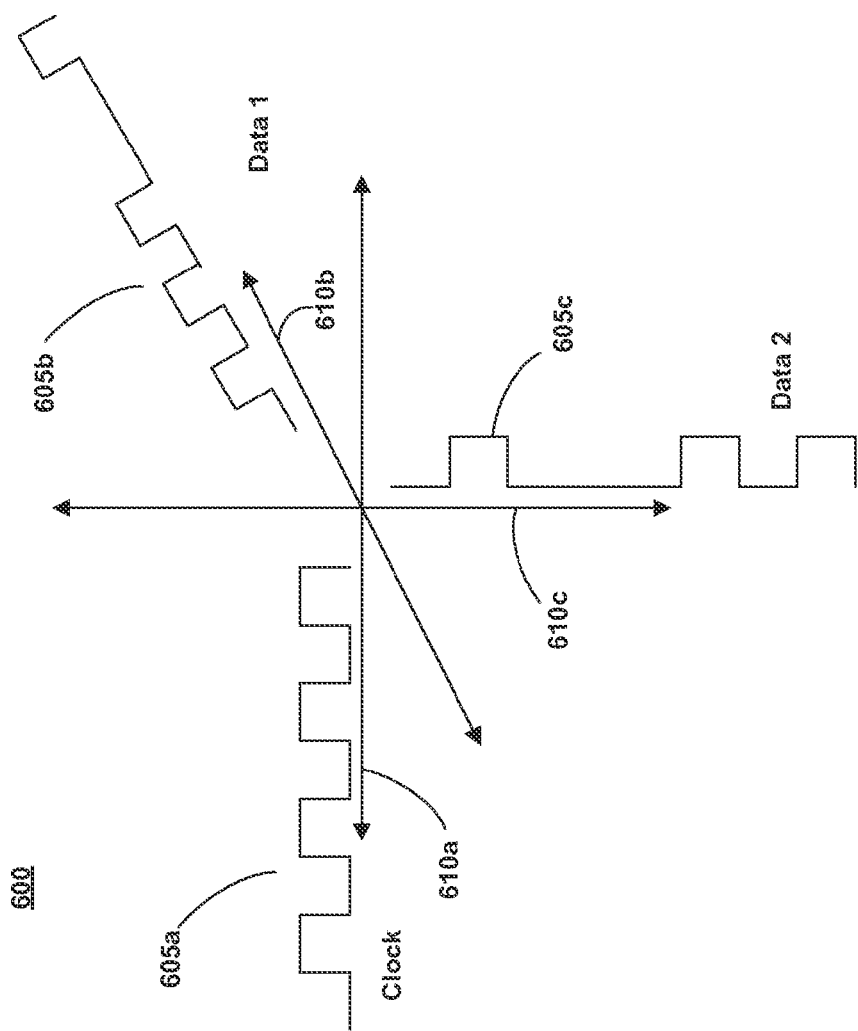
FIG. 6 is a three-dimensional timing diagram illustrating a per-basis-component subsignal transmission at a kiosk as may be presented in some embodiments.

FIG. 6 is a three-dimensional timing diagram illustrating a per-basis-component subsignal transmission at a kiosk as may be presented in some embodiments. In some embodiments, the kiosk may take advantage of the compass' ability to detect a three-dimensional orientation to layer multiple subsignals on each dimension. For example, a clock signal 605a may be presented on a first dimension 610a and data signals 605b and 605c on dimensions 610b and 610c respectively (data signal 605c may be a quantization calibration signal in some embodiments as discussed herein). The data signals 605b may provide verification information concerning the kiosk, as well as information about the business entity, the premises, and/or the nature of the tracking. The clock signal may be used, e.g., to decode a Manchester encoded subsignal within one of data signals 605b,c. Following the relative determination of the orientation between the mobile device and the kiosk, the application on the mobile device may determine which subsignal corresponds to which dimension (e.g., identification of the clock signal may then be used to infer the data signal dimensions). Though depicted here as being three, spatially orthogonal signals in physical dimensions, one will recognize that in some embodiments the subsignals may appear on different frequency modulated signals, or using other composition methods known in the art.

Figure 7:
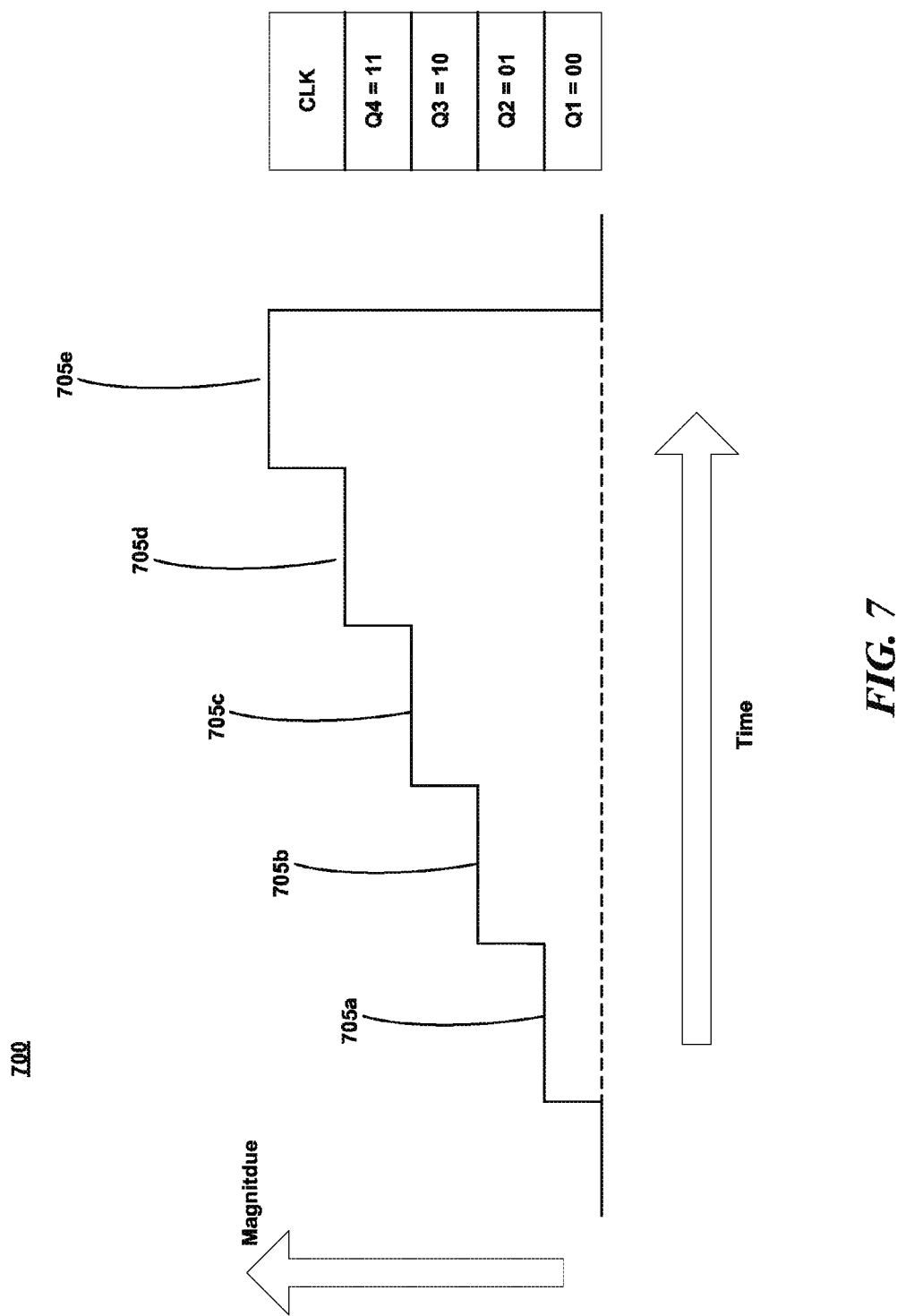
FIG. 7 is a timing diagram illustrating a quantization calibration signal as may be presented in some embodiments.

In some embodiments, the physical ritual may also require an affirmative gesture beyond placing the mobile device in, or near, the kiosk. For example, before authorizing tracking, the application on the mobile device may monitor the relationship between the kiosk signal transmitter orientation and the mobile device's orientation (e.g., using the same Procrustes fit-type approach). If the mobile device is successively oriented in a predetermined sequence of orientations relative to the kiosk, tracking authorization may be provided. For example, the user may insert the mobile device into the kiosk and then wave it about to signal tracking authorization. In some embodiments, the mobile device may indicate successful authorization to the user by vibrating, making a noise, etc. In some embodiments, the kiosk may indicate successful authorization by making a noise, illuminating a light, etc. For example, the network server may inform the ki Quantization Calibration FIG. 7 is a timing diagram illustrating a quantization calibration signal 700 as may be presented in some embodiments. For example, in some embodiments, while a clock signal may be transmitted on dimension 610a and a Manchester encoded signal on dimension 610b, the third dimension 610c may be used to calibrate a plurality of quantization thresholds. Quantization may allow much more information to be transmitted form the kiosk to the mobile device and possibly with fewer errors. The calibration signal may compose a plurality of staged transmissions 705a-e that each indicate the magnitude (e.g., of the magnetic field) associated with a given quantization value. For example, the staged transmissions 705a-d may correspond to quantization levels Q1-Q4 respectively, which may themselves correspond to various bit encodings (Q1 reflecting the bits "00", Q2 reflecting the bits "01", etc.). Though four encodings are provided in this example, one will appreciate that in some embodiments many more encodings may be presented. In this example, a fifth encoding 705e may be depicted reflecting the magnitude of the clock or other signal. One will recognize that the data signal may be quantized/dequantized before and/or after encoding/decoding.

Manchester Encoding Example

Figure 8:
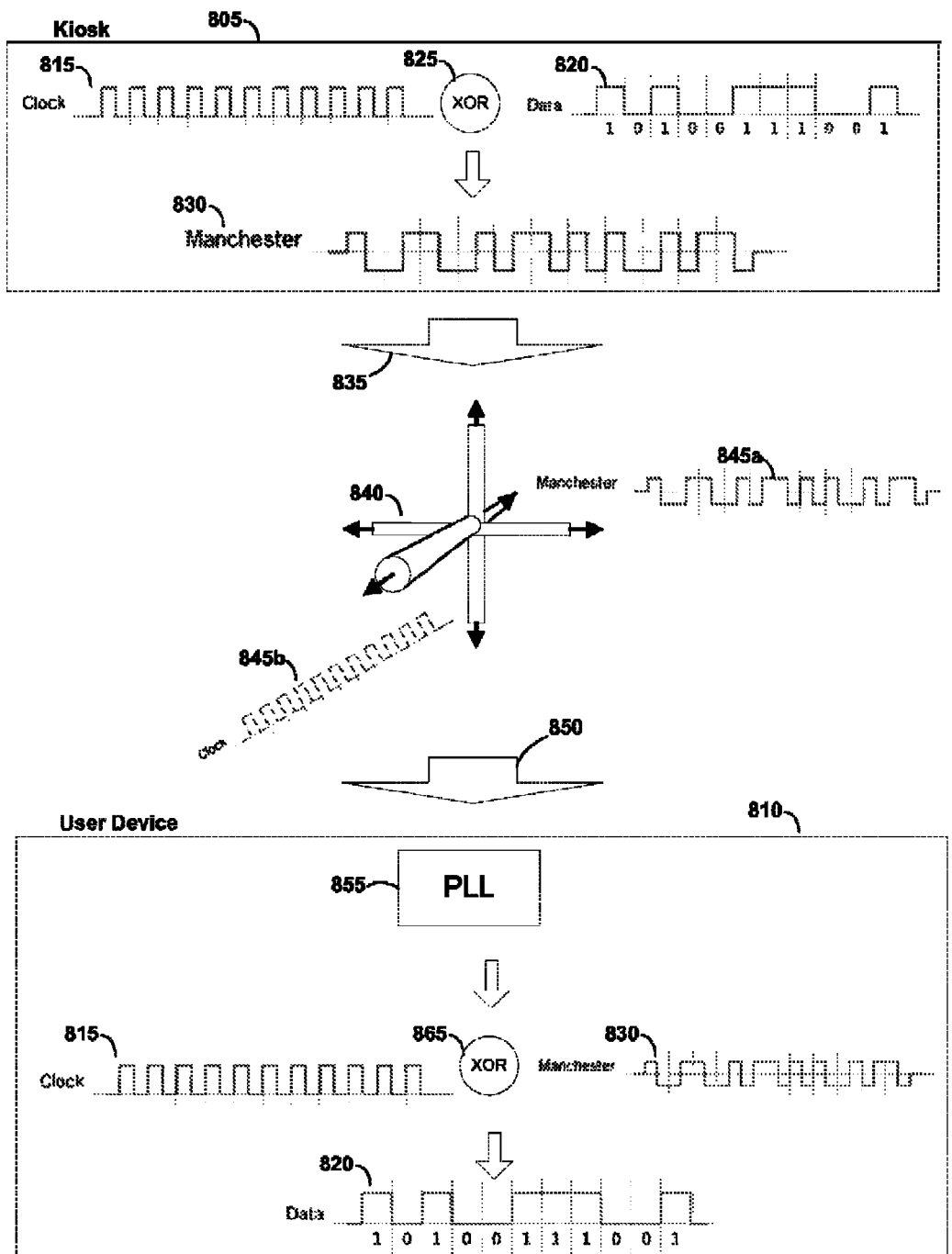
FIG. 8 is a block flow diagram illustrating a process for Manchester encoding and decoding signals between a kiosk and a user device as may be presented in some embodiments.

FIG. 8 is a block flow diagram illustrating a process for Manchester encoding and decoding signals between a kiosk and a user device as may be presented in some embodiments. Proceeding from top to bottom, a kiosk 805 may generate a Manchester-encoded signal 830 by XORing 825 a clock signal 815 with a data signal 820. The Manchester-encoded signal 830 may then be transmitted 835 along one or more dimensions of the kiosk's signal generation system along with the clock signal 815. For example, the Manchester-encoded signal may appear as a subsignal 845a and the clock signal as a subsignal 845b. These subsignals may be received 850 at a user device 810.

A hardware/firmware/software phase locked loop 855 may be used to align the clock subsignal 845b and the data subsignal 845a. Once aligned, the clock 815 and Manchester encoded data 830 may be XOR'd 865 to recover the original data signal 820 (e.g., the data signal containing the kiosk verification information and/or the kiosk unique ID).

Example Signal Processing Flow

Figure 9:
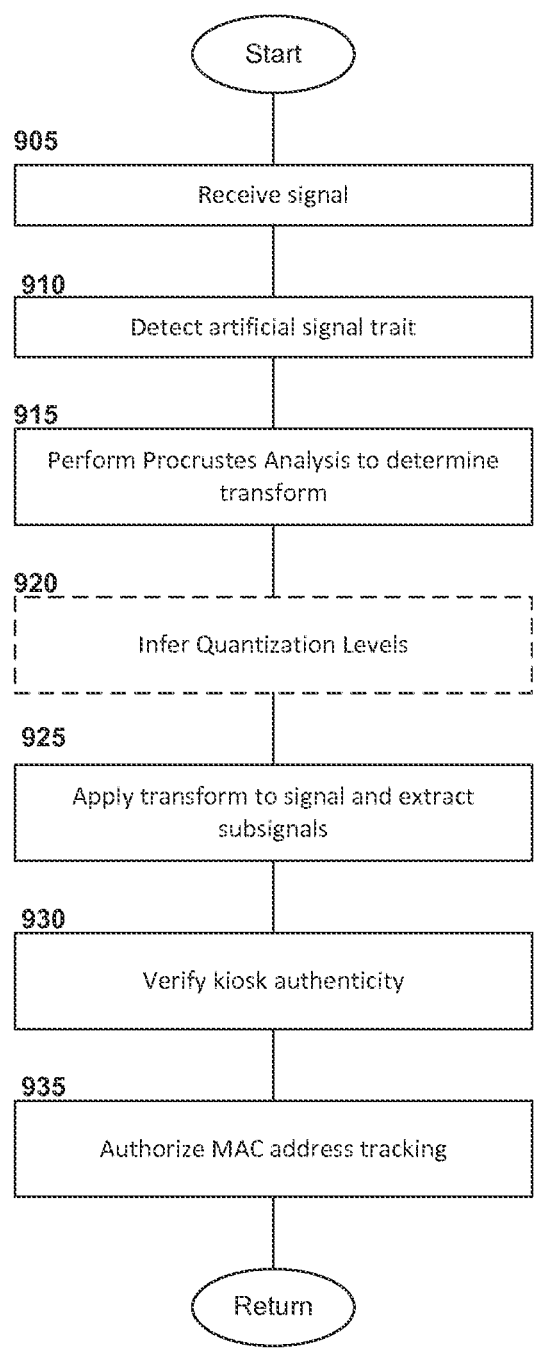
FIG. 9 is a flow diagram illustrating a process for determining the relative orientation of a user device and a kiosk signal generator and for performing address tracking authorization as may be presented in some embodiments.

FIG. 9 is a flow diagram illustrating a process 900 for determining the relative orientation of a user device and a kiosk signal generator and for performing address tracking authorization as may be presented in some embodiments.

At block 905, the user device may receive the signal from the kiosk. For example, the compass on the mobile device may begin to register the kiosk signal at a greater level than the Earth's magnetic field signal.

At block 910, the user device may detect a trait in the signal indicating its origin from a kiosk. For example, a periodicity may indicate that a sonic signal originates from a kiosk. Similarly, a magnitude well above levels generated on the Earth may also be used to determine when a compass component is sensing the kiosk's magnetic field.

At block 915, the application on the user device may determine the orientation of each of the subsignal dimensions. For example, the application may infer the directions of maximum amplitude. A Prucrustes-type fit may be used to align the antennae lobes of the compass with the lobes of the kiosk transmitter.

At block 920, the application may infer the quantization levels of the signals. In some embodiments, the quantization levels may be hardcoded in the application. In some embodiments, the application may consider the calibration subsignal to infer the appropriate values.

At block 925, the application may filter the subsignals (e.g., quantization calibration, clock, Manchester encoded data, etc.). Where the subsignals are spatially present, the mobile device may filter based upon the spatial magnitudes. Where the subsignals are modulated on different frequencies, frequency demodulation processes known in the art may be applied. In some embodiments, the quantization calibration signal may be decoded before the data signals and the levels of block 920 identified. In this manner, the data signals may be converted to a final, non-quantized form.

At block 930, the application may verify the kiosk's authenticity, e.g., by relaying a portion of the data subsignal to a trusted network server and receiving confirmation that the subsignal reflects a genuine signal. For example, the kiosk may retransmit a verification, e.g., a codeword, received from the network server to the mobile device. The kiosk may also transmit a certificate which the mobile device may verify with a certificate authority.

At block 935, the application may authorize the tracking of the user device's network address. In some embodiments, the application may present a confirmation screen to the user and may display the extent and terms of the tracking. In some embodiments, the application may generate an acknowledgement sound or vibration. In some embodiments, the authorization may proceed silently without further involving the user beyond the physical ritual.

Example Kiosk Components and Operation

Figure 10:
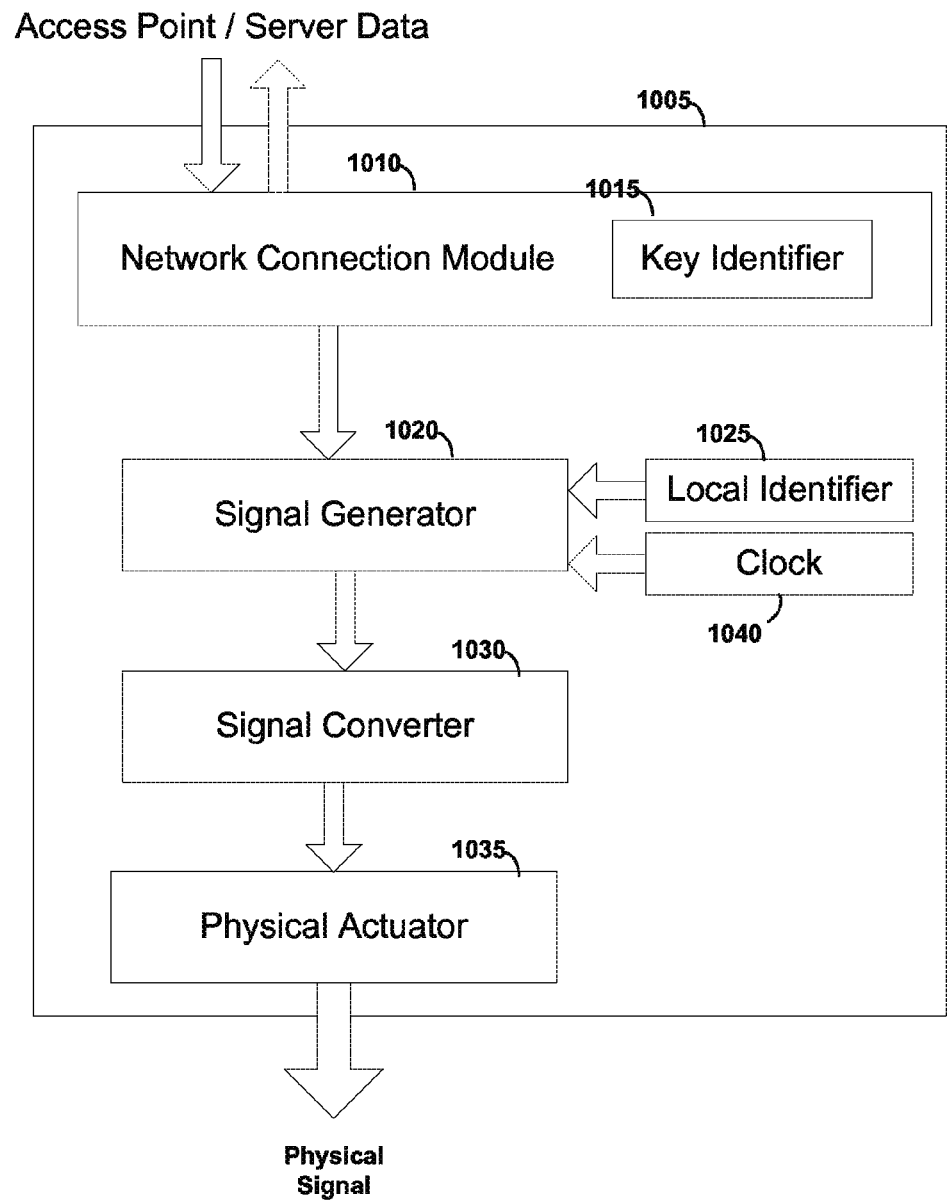
FIG. 10 is a block diagram illustrating various hardware/firmware/software components in a kiosk as may occur in some embodiments.

FIG. 10 is a block diagram illustrating various hardware/firmware/software components in a kiosk as may occur in some embodiments. The depicted blocks may be hardware, software, or firmware modules. In some embodiments, the kiosk 1005 may receive verification information (a codeword, rotating key, certificate, etc.) from an access point or server. In some embodiments, the verification may be received from a manual operator (not depicted) or from a stored memory on the kiosk. A network connection module 1005 may receive the data. A key identifier 1015 (e.g., the rotating key or codeword), may be included in the data or separately hardcoded in the kiosk 1005. The system may pass this information to a signal generator 1020 along with a local identifier 1025 and a clock signal 1040. The signal generator 1020 may combine the verification data, a clock signal, and a quantization calibration signal into an output signal for transmission. A signal converter 1030, e.g., a digital to analog converter or driver, may change the representation of the signals in the output signal and present them to a physical actuator 1035 (e.g., a near-field radio antenna, one or more electromagnets, a sonic actuator, etc.).

Figure 11:
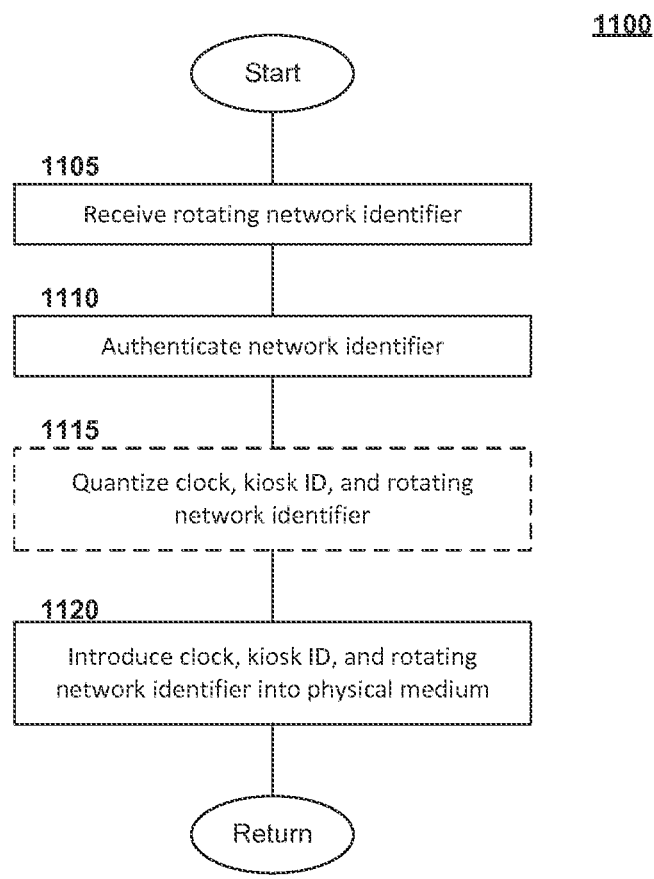
FIG. 11 is a flow diagram illustrating a process for signal generation at a kiosk as may occur in some embodiments.

FIG. 11 is a flow diagram illustrating a process for signal generation at a kiosk 1005 as may occur in some embodiments. At block 1105, the kiosk may receive locally, or over a network, the rotating network identifier, certification, or other verification data. In some embodiments, at block 1110, the kiosk may authenticate the verification data, e.g., to ensure that the verification data is not presented by an impersonator. For example, the kiosk 1010 may consult a certificate authority or internal private key to perform the confirmation. At block 1115, as part of the signal generation at the generator component 1020, the kiosk may quantize the signals to improve transmission bandwidth. At block 1120, the system may introduce the output signal into the physical medium e.g., by manipulating the actuator 1035.

Example User Device/Application Components and Operation

Figure 12:
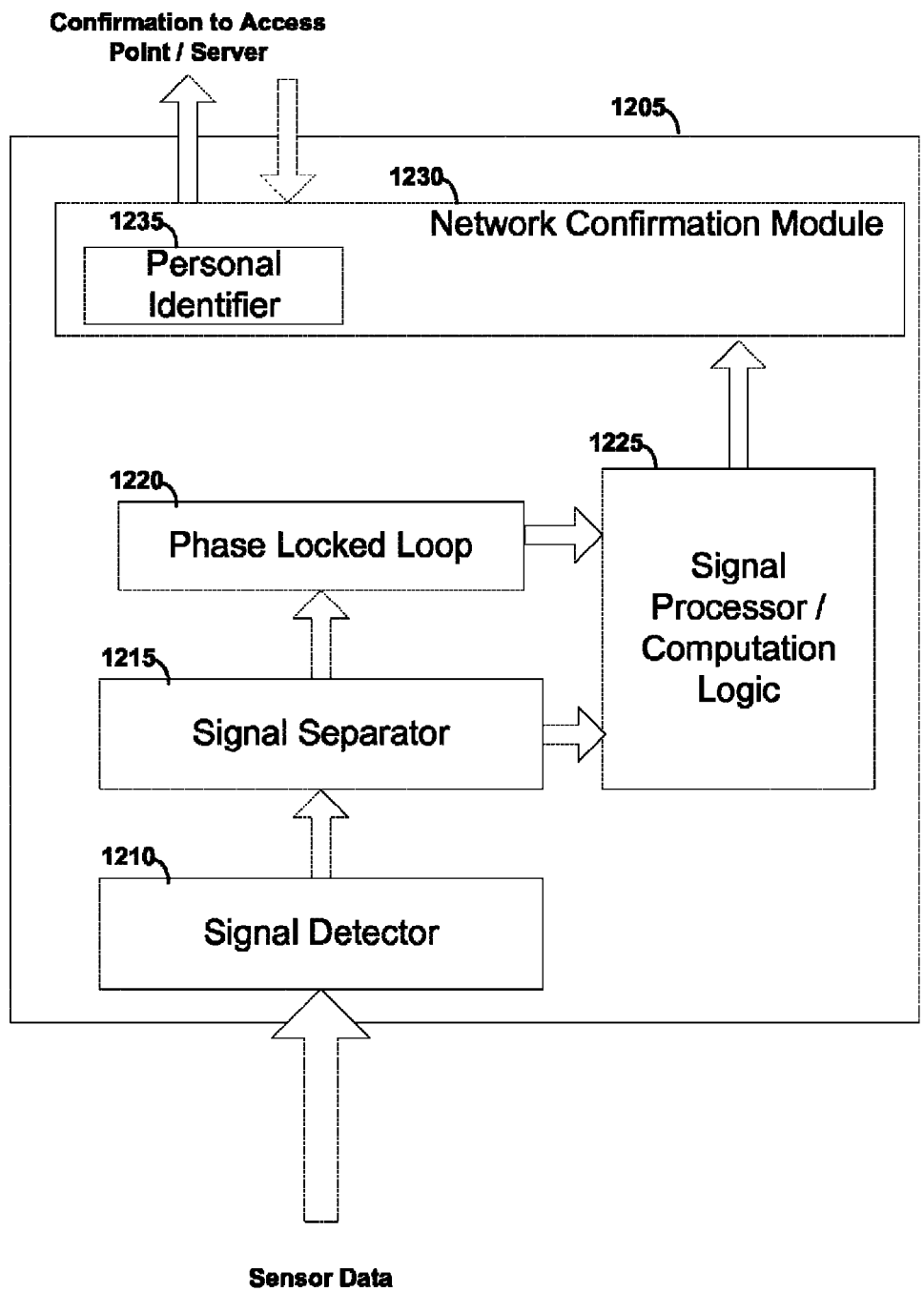
FIG. 12 is a block diagram illustrating various hardware/firmware/software components in a user device as may occur in some embodiments.

FIG. 12 is a block diagram illustrating various hardware/firmware/software components in a user device as may occur in some embodiments. The sensor data from a physical receiver (e.g., a compass, a microphone, a photodetector, etc.) may be received at a signal detector 1210. The signal detector 1210 may be a passive thread in the user application that waits for the unique signal pattern of the kiosk. Following detection, the signal detector 1210 may pass the signal to signal separator 1215 (e.g., a frequency or spatial demultiplexer). The signal may also be passed to a PLL 1210 for synchronization as discussed above. Signal processor/computation logic 1225 may then be used to analyze the data signal and to extract the authentication information and/or the kiosk key identifier. Using this information the computation logic 1225 may consult an authenticator/network server via network confirmation module 1230 to ensure that the kiosk is authentic. The logic 1225 may also authorize tracking via the network confirmation module 1230. A personal identifier 1235 by which the user may be identified may also be provided when authorizing tracking. For example, a user identifier (e.g., associated with a social networking system), a username, a merchant account, etc. may be conveyed. Thus, if the same mobile device were used by different individuals, the individual currently logged into the device may subsequently be associated with the tracking results. In those embodiments where the personal identifier may be a device identifier, the identifier may be, e.g., a MAC address or an International Mobile Station Equipment Identity (IMEI).

Figure 13:
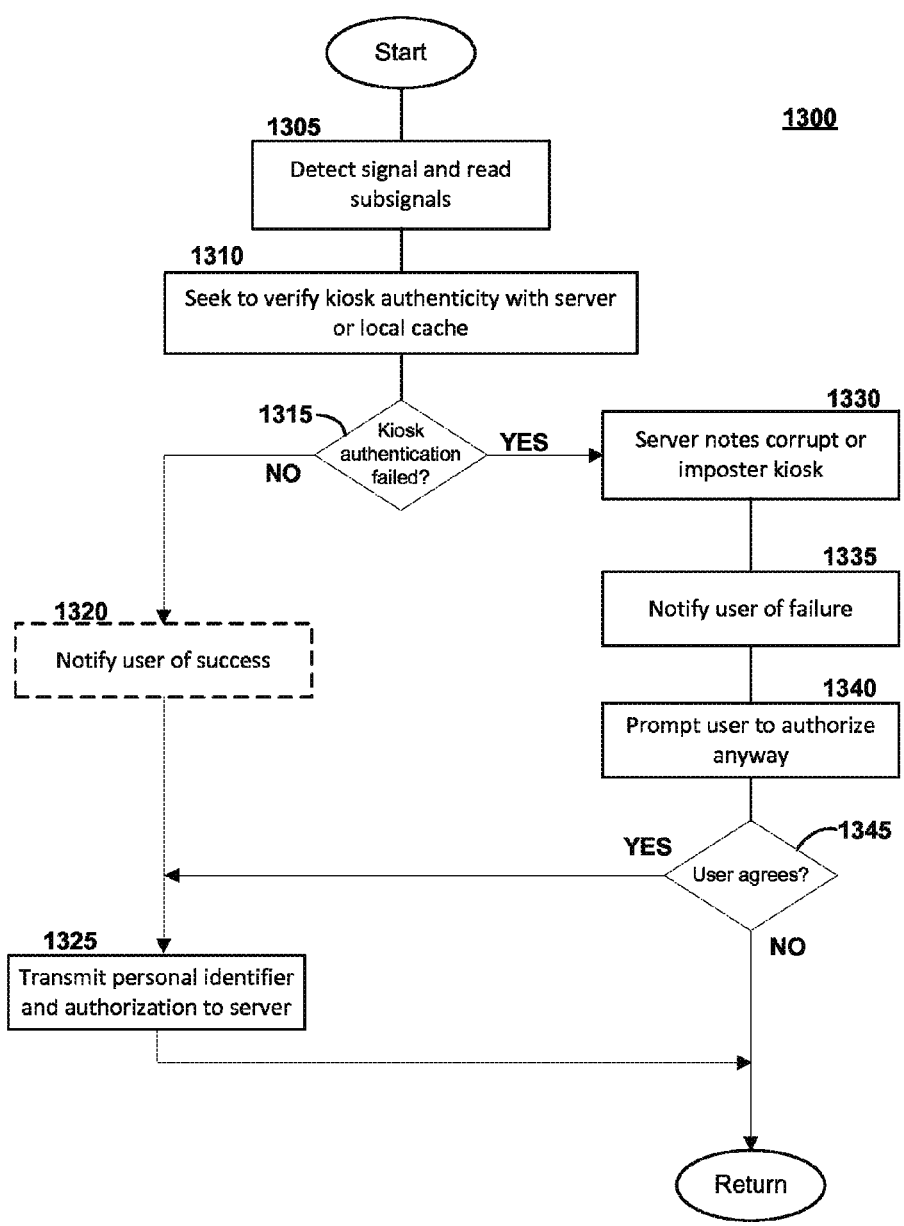
FIG. 13 is a flow diagram illustrating a process for authorizing address tracking at a user device as may occur in some embodiments.

FIG. 13 is a flow diagram illustrating a process for authorizing address tracking at a user device as may occur in some embodiments. At block 1305, the user device application may detect the kiosk signal and read the subsignals (if present). At block 1310, the application may seek to verify the kiosk authenticity with the server, with a local cache of authenticated kiosk IDs, etc. For example, the user may transmit the verification information from the signal. If kiosk authentication succeeded, at block 1315, the system may notify the user of the success at block 1320. Such notification, if present, may occur after bock 1325 in some embodiments. At block 1325, the system may transmit the user's personal identifier and authorization for tracking to the server/access point.

If kiosk authentication failed at block 1315, the user device may send a notification to the server which would note the presence of a corrupt or imposter kiosk device at block 1330 (the user device may make a local note as well). At block 1335 the system may notify the user of the failure and may provide some explanatory detail. In some embodiments, at block 1340, the application may inquire if the system desires to authorize tracking anyway. If the user agrees, then authorization may be provided at block 1325.

Computer System

Figure 14:
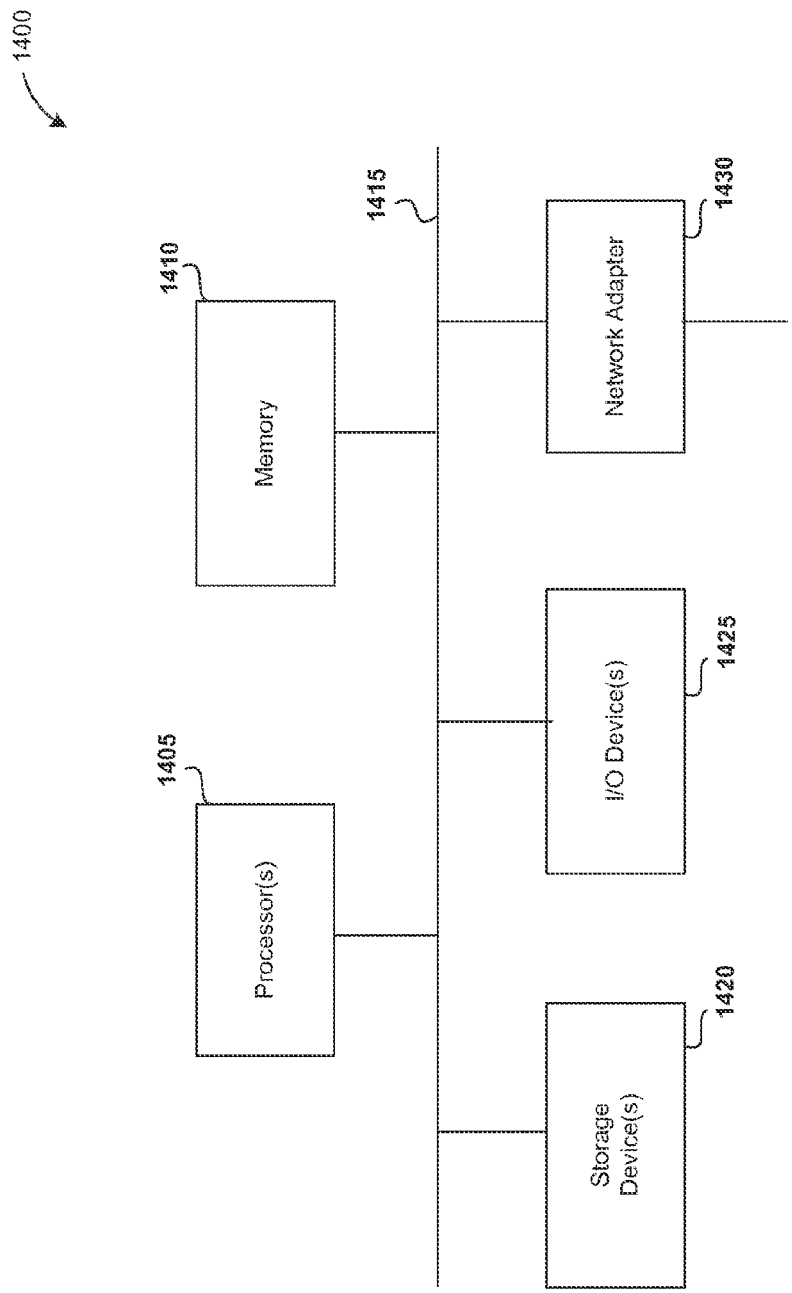
FIG. 14 is a block diagram of a computer system as may be used to implement features of some of the embodiments.

FIG. 14 is a block diagram of a computer system as may be used to implement features of some of the embodiments. The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method for providing user tracking authorization, comprising:
   detecting, by a mobile device, a signal from a kiosk, the mobile device associated with a unique identifier;
   extracting, by the mobile device, a verification from the signal from the kiosk, wherein the verification is associated with a kiosk identifier, wherein the kiosk identifier includes a rotating key identifier and a local identifier;
   determining, by the mobile device, that the kiosk is authentic using the verification; and
   transmitting, by the mobile device, an authorization to track the unique identifier, wherein the authorization is determined at least based on the kiosk identifier.

2. The computer-implemented method of claim 1, wherein detecting the signal from the kiosk comprises using a compass on the mobile device to detect a magnetic signal from the kiosk.

3. The computer-implemented method of claim 2, wherein extracting the verification comprises:
   demultiplexing a clock signal and an encoded data signal from the signal from the kiosk, the encoded data signal comprising the verification; and
   decoding the encoded data signal using the clock signal.

4. The computer-implemented method of claim 3, wherein demultiplexing a clock signal and an encoded data signal comprises determining physical dimensions on which the clock signal and encoded data signal are transmitted.

5. The computer-implemented method of claim 3, wherein extracting the verification further comprises demultiplexing a quantization calibration signal, and wherein decoding the encoded data signal using the clock signal further comprises deqauntizing the encoded data signal using the quantization calibration signal.

6. The computer-implemented method of claim 1, wherein determining that the kiosk is authentic comprises transmitting, by the mobile device, the verification to a server and receiving, by the mobile device, a positive confirmation regarding the verification.

7. The computer-implemented method of claim 1, wherein the unique identifier is a MAC address.

8. The computer-implemented method of claim 1, further comprising detecting the kiosk identifier based on a manipulation of a compass of the mobile device, wherein the manipulation is associated with a magnetic field emitted by the kiosk.

9. A non-transitory computer-readable medium comprising instructions configured to cause one or more processors to perform a method comprising:
   detecting, by a mobile device, a signal from a kiosk, the mobile device associated with a unique identifier;
   extracting, by the mobile device, a verification from the kiosk, wherein the verification is associated with a kiosk identifier, wherein the kiosk identifier includes a rotating key identifier and a local identifier;
   determining, by the mobile device, that the kiosk is authentic using the verification; and
   transmitting, by the mobile device, an authorization to track the unique identifier, wherein the authorization is determined at least based on the kiosk identifier.

10. The non-transitory computer-readable medium of claim 9, wherein detecting the signal from the kiosk comprises using a compass on the mobile device to detect a magnetic signal from the kiosk.

11. The non-transitory computer-readable medium of claim 10, wherein extracting the verification comprises:
    demultiplexing a clock signal and an encoded data signal from the signal from the kiosk, the encoded data signal comprising the verification; and
    decoding the encoded data signal using the clock signal.

12. The non-transitory computer-readable medium of claim 11, wherein demultiplexing a clock signal and an encoded data signal comprises determining physical dimensions on which the clock signal and encoded data signal are transmitted.

13. The non-transitory computer-readable medium of claim 11, wherein extracting the verification further comprises demultiplexing a quantization calibration signal, and wherein decoding the encoded data signal using the clock signal further comprises deqauntizing the encoded data signal using the quantization calibration signal.

14. The non-transitory computer-readable medium of claim 9, wherein determining that the kiosk is authentic comprises transmitting, by the mobile device, the verification to a server and receiving, by the mobile device, a positive confirmation regarding the verification.

15. The non-transitory computer-readable medium of claim 9, wherein the unique identifier is a MAC address.

16. The non-transitory computer-readable medium of claim 9, wherein the method comprises detecting the kiosk identifier based on a manipulation of a compass of the mobile device, and wherein the manipulation is associated with a magnetic field emitted by the kiosk.

17. A kiosk comprising:
    a verification receiver configured to receive a verification from across a network, wherein the verification is associated with a kiosk identifier, wherein the kiosk identifier includes a rotating key identifier and a local identifier;
    a signal generator configured to combine the verification with a clock signal into an output signal; and
    a physical actuator configured to output the output signal on a physical medium, wherein the output signal includes an authorization determined at least based on the kiosk identifier.

18. The kiosk of claim 17, wherein the physical actuator comprises an electromagnet configured to output a magnetic signal, the magnetic signal stronger than the Earth's magnetic field.

19. The kiosk of claim 17, the signal generator further configured to combine a quantization calibration signal into the output signal.

20. The kiosk of claim 17, the signal generator further configured to Manchester encode the verification using the clock signal.

21. The kiosk of claim 17, the kiosk further comprising an enclosure configured to receive a mobile device, the enclosure further configured to confine at least a portion of the output signal.

22. The kiosk of claim 17, wherein the physical actuator is configured to transmit multiple subsignals on multiple dimensions.

23. The kiosk of claim 17, wherein the kiosk identifier is detected based on a manipulation of a compass of the mobile device, and wherein the manipulation is associated with a magnetic field emitted by the kiosk.

* * * * *